United States Patent
Higashikawa et al.

(10) Patent No.: US 8,657,406 B2
(45) Date of Patent: Feb. 25, 2014

(54) LIQUID JETTING APPARATUS

(75) Inventors: Reiko Higashikawa, Iwakura (JP);
Hirofumi Kondo, Tajimi (JP);
Tomoyuki Kubo, Nagoya (JP);
Masayoshi Hayashi, Nagoya (JP);
Masato Sueyasu, Nagoya (JP); Toru Yamashita, Nagoya (JP); Tatsuya Nishikawa, Nagoya (JP); Yasuhiro Kato, Nagoya (JP); Shuhei Hiwada, Toyoake (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/613,920

(22) Filed: Sep. 13, 2012

(65) Prior Publication Data
US 2013/0083121 A1 Apr. 4, 2013

(30) Foreign Application Priority Data
Sep. 29, 2011 (JP) ................................. 2011-214594

(51) Int. Cl.
*B41J 2/165* (2006.01)
(52) U.S. Cl.
USPC ........................................................... 347/30
(58) Field of Classification Search
USPC .......................................................... 347/30
See application file for complete search history.

(56) References Cited

U.S. PATENT DOCUMENTS

| 2006/0187264 A1 | 8/2006 | Endo | |
| 2006/0232632 A1* | 10/2006 | Kosugi | 347/55 |
| 2009/0231387 A1 | 9/2009 | Shinkawa | |
| 2009/0262162 A1* | 10/2009 | Endo et al. | 347/31 |

FOREIGN PATENT DOCUMENTS

| JP | 2006/224554 | 8/2006 |
| JP | 2006/256149 | 9/2006 |
| JP | 2009/241578 | 10/2009 |
| JP | 2010/143016 | 7/2010 |

* cited by examiner

*Primary Examiner* — Matthew Luu
*Assistant Examiner* — Alexander D Shenderov
(74) *Attorney, Agent, or Firm* — Frommer Lawrence & Haug LLP

(57) ABSTRACT

A liquid jetting apparatus is provided including: a liquid jetting head having a nozzle formed therein through which the liquid is jetted; a driving unit which is configured to output energy to the liquid jetting head; an energy recovery mechanism which is configured to recover and supply a part of the energy supplied from the driving unit to the liquid jetting head; and a mist removing unit to which the part of the energy recovered by the energy recovery mechanism is supplied so that the supplied energy is used to remove a mist generated under a condition that the liquid jetting head jets the liquid.

16 Claims, 12 Drawing Sheets

LIQUID JETTING APPARATUS

CROSS REFERENCE TO RELATED APPLICATION

The present application claims priority from Japanese Patent Application No. 2011-214594 filed on Sep. 29, 2011, the disclosures of which are incorporated herein by reference in their entirety.

BACKGROUND OF THE INVENTION

1. Field of the Invention

The present invention relates to a liquid jetting apparatus for jetting a liquid.

2. Description of the Related Art

Conventionally, a liquid jetting apparatus is known, which is provided with mist removing means for removing a mist which is generated when a liquid is jetted from nozzles and which floats around the nozzles. For example, a printer based on the ink-jet system, which records, for example, letters and images by jetting inks from nozzles with respect to a recording medium, is known as the liquid jetting apparatus as described above.

The printer is provided with a halogen heater which is provided on the downstream side of a recording head in the transporting direction in order that the recording medium, onto which the inks have been jetted, is heated and dried. An electrode member is stuck to an edge portion of a heat generating surface of the halogen heater opposed to the recording medium to be transported. A positive terminal (plus terminal) of a power source, which is exclusively usable to apply the voltage, is connected to the electrode member. On the other hand, a negative terminal (minus terminal) of the power source is connected to a nozzle plate of the recording head formed with the nozzles, which is retained at the ground electric potential.

When the positive voltage (plus voltage) is applied from the power source to the electrode member, an electric field is generated between the electrode member and the nozzle plate. The electrode member is electrically charged with the positive (plus) electric charge, and the nozzle plate is electrically charged with the negative (minus) electric charge. The ink, which is jetted from the recording head, is jetted from the nozzles while having the negative electric charge. The jetted ink has an electric charge amount (electrification amount) corresponding to the areal size of openings of the nozzles. The floating mist, which is generated by jetting the ink from the nozzles, is electrically charged negative. Therefore, the floating mist is attracted and electrostatically adsorbed by the electrode member which is electrically charged positive, by means of the Coulomb's force.

SUMMARY OF THE INVENTION

The printer as described above requires the power source which is provided as the driving device exclusively usable to apply the voltage to the electrode member, i.e., to drive the mist removing mechanism. Therefore, the printer has the driving device for driving the mist removing mechanism in addition to a driving device for driving the recording head. Therefore, the electric power consumption is consequently increased, and the cost is consequently increased.

In view of the above, an object of the present invention is to provide a liquid jetting apparatus in which a mist removing device is driven by effectively utilizing the energy for driving a liquid jetting head so that the cost is reduced and the energy efficiency is enhanced thereby.

According to an aspect of the present invention, there is provided a liquid jetting apparatus which jets a liquid onto a medium, including:
a liquid jetting head having a nozzle formed therein through which the liquid is jetted;
a driving unit which is configured to output driving energy for driving the liquid jetting head;
an energy recovery mechanism which is configured to recover a part of the driving energy to be supplied from the driving unit to the liquid jetting head; and
a mist removing unit to which the part of the driving energy recovered by the energy recovery mechanism is supplied so that the supplied energy is used to remove a mist generated under a condition that the liquid jetting head jets the liquid.

According to the liquid jetting apparatus of the present teaching, a part of the driving energy, which is supplied from the driving unit when the liquid jetting head is driven in order to jet the liquid from the nozzles, is recovered, which is effectively utilized as the driving energy for driving the mist removing unit. Accordingly, it is unnecessary to provide any driving unit which is exclusively usable to drive the mist driving unit. It is possible to reduce the cost, and it is possible to enhance the energy efficiency.

DESCRIPTION OF THE PREFERRED EMBODIMENTS

Figure 1:
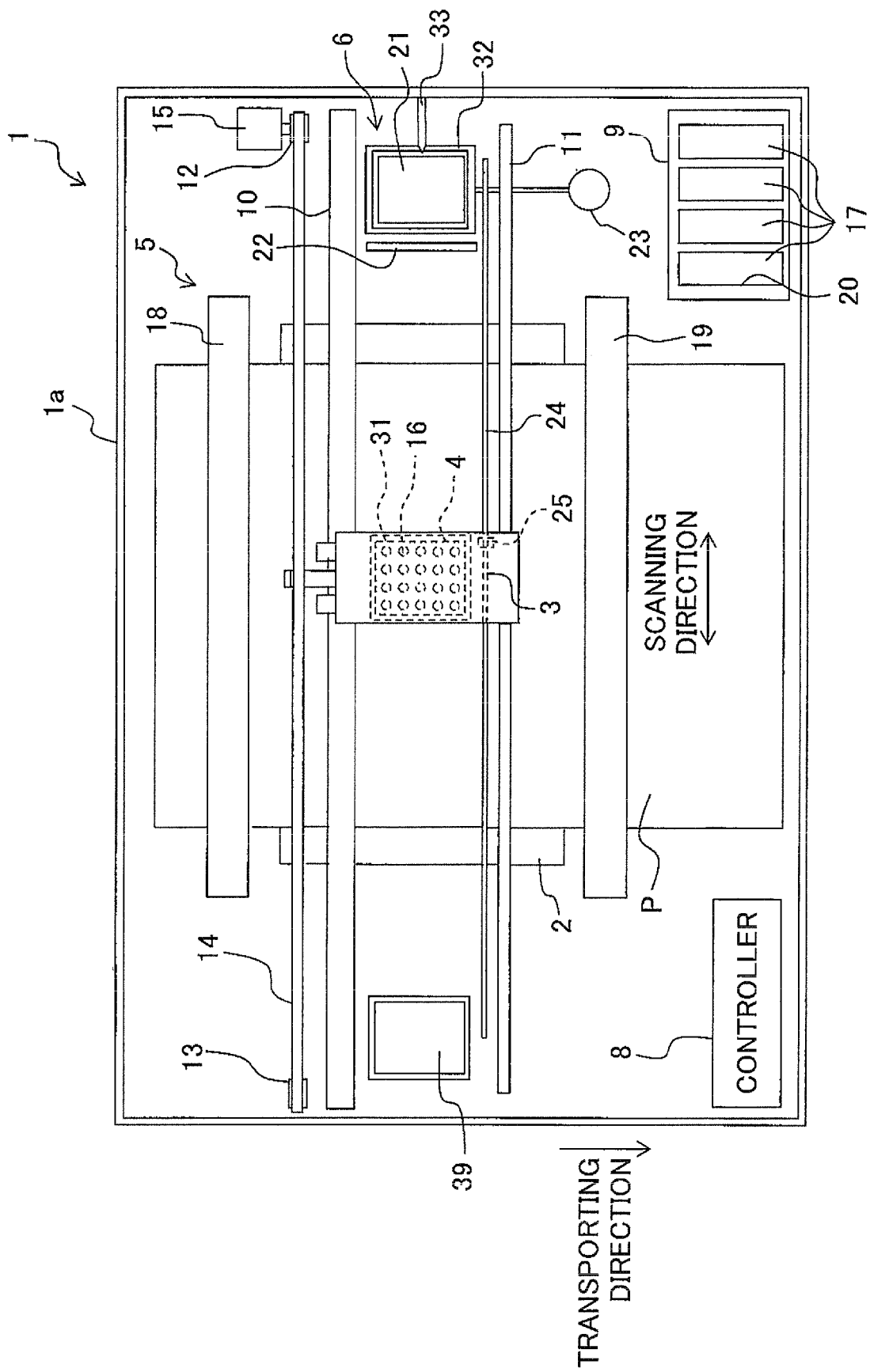
FIG. 1 shows a schematic arrangement of an ink-jet printer according to an embodiment of the present teaching.

Next, an embodiment of the present teaching will be explained. As shown in FIG. 1, an ink-jet printer 1 (liquid jetting apparatus) includes, for example, a platen 2 on which the recording paper P is placed, a carriage 3 which is reciprocatively movable in the scanning direction parallel to the platen 2, an ink-jet head 4 (liquid jetting head) which is carried on the carriage 3, a transporting mechanism 5 which transports the recording paper P in the transporting direction perpendicular to the scanning direction, a maintenance unit 6 which performs various maintenance operations in relation to the recovery and the maintenance of the liquid jetting performance of the ink-jet head 4, an electric current recovery circuit 93 (see FIG. 6) which recovers a part of the electric current supplied to the ink-jet head 4, a mist adsorbing device 7 (see FIG. 5) which recovers the mist in accordance with the electrostatic adsorption, and a controller 8 which manages the control of the entire ink-jet printer 1.

[Arrangement for Image Recording]

At first, an explanation will be made about an arrangement for the image recording. The recording paper P, which is supplied from a paper feed mechanism (not shown), is placed on the upper surface of the platen 2. Two guide rails 10, 11 are provided over or above the platen 2. The guide rails 10, 11 extend in parallel to the left-right direction (scanning direction) as shown in FIG. 1 until arrival at both ends of a casing 1a of the ink-jet printer 1, the casing 1a being made of a resin material.

The carriage 3 is reciprocatively movable in the scanning direction along the two guide rails 10, 11 in an area opposed to the platen 2. Further, the carriage 3 is movable from an area (recording area) opposed to the recording paper P disposed on the platen 2 to both ends in the scanning direction in the casing la separated from the platen 2, the both ends being disposed in a non-recording area. An endless belt 14, which is applied and wound between two pulleys 12, 13, is connected to the carriage 3. When the endless belt 14 is allowed to travel by being driven by a carriage driving motor 15, the carriage 3 is moved in the scanning direction in accordance with the travel of the endless belt 14.

A linear encoder 24, which has a large number of light-transmissive portions (slits) arranged while providing spacing distances in the scanning direction, is provided on the casing 1a of the ink-jet printer 1. On the other hand, a transmission type photosensor 25, which has a light-emitting element and a light-receiving element, is provided on the carriage 3. The ink-jet printer 1 is capable of detecting the present position of the carriage 3 in relation to the scanning direction, from the counted value (number of times of detection) provided by the light-transmissive portion of the linear encoder 24 as detected by the photosensor 25 during the movement of the carriage 3.

The ink-jet head 4 is attached to a lower portion of the carriage 3. The lower surface of the ink-jet head 4 (surface disposed on the opposite side in relation to the paper surface of FIG. 1), which is parallel to the upper surface of the platen 2, is an ink-jetting surface 4a on which a plurality of nozzles 16 are open (see FIG. 4). As shown in FIG. 1, a holder 9 is fixed to the casing 1a of the ink-jet printer 1. Four ink cartridges 17, in which four color inks (black, yellow, cyan, and magenta) are stored respectively, are exchangeably installed/removed with respect to four cartridge installing sections 20 of the holder 9.

The holder 9 is connected to the ink-jet head 4 carried on the carriage 3, by means of unillustrated four tubes. The inks contained in the four ink cartridges 17 are supplied respectively via the four tubes to the ink-jet head 4. The ink-jet head 4 jets the four color inks from the plurality of nozzles 16 to the recording paper P placed on the platen 2.

The transporting mechanism 5 has two transporting rollers 18, 19 which are arranged to interpose the platen 2 in the transporting direction. The recording paper P, which is placed on the platen 2, is transported in the transporting direction (frontward direction as viewed in FIG. 1) by means of the two transporting rollers 18, 19.

In the ink-jet printer 1, the inks are jetted to the recording paper P which is placed on the platen 2 from the ink-jet head 4 which is reciprocatively movable in the scanning direction (left-right direction as viewed in FIG. 1) together with the carriage 3. Further, the recording paper P is transported in the transporting direction (frontward direction as viewed in FIG. 1) by means of the two transporting rollers 18, 19. Thus, for example, desired images and/or letters are recorded on the recording paper P. The carriage 3, the pulleys 12, 13, the endless belt 14, and the carriage driving motor 15 of this embodiment correspond to the scanning mechanism according to the present teaching.

[Structure of Ink-jet Head]

Figure 2:
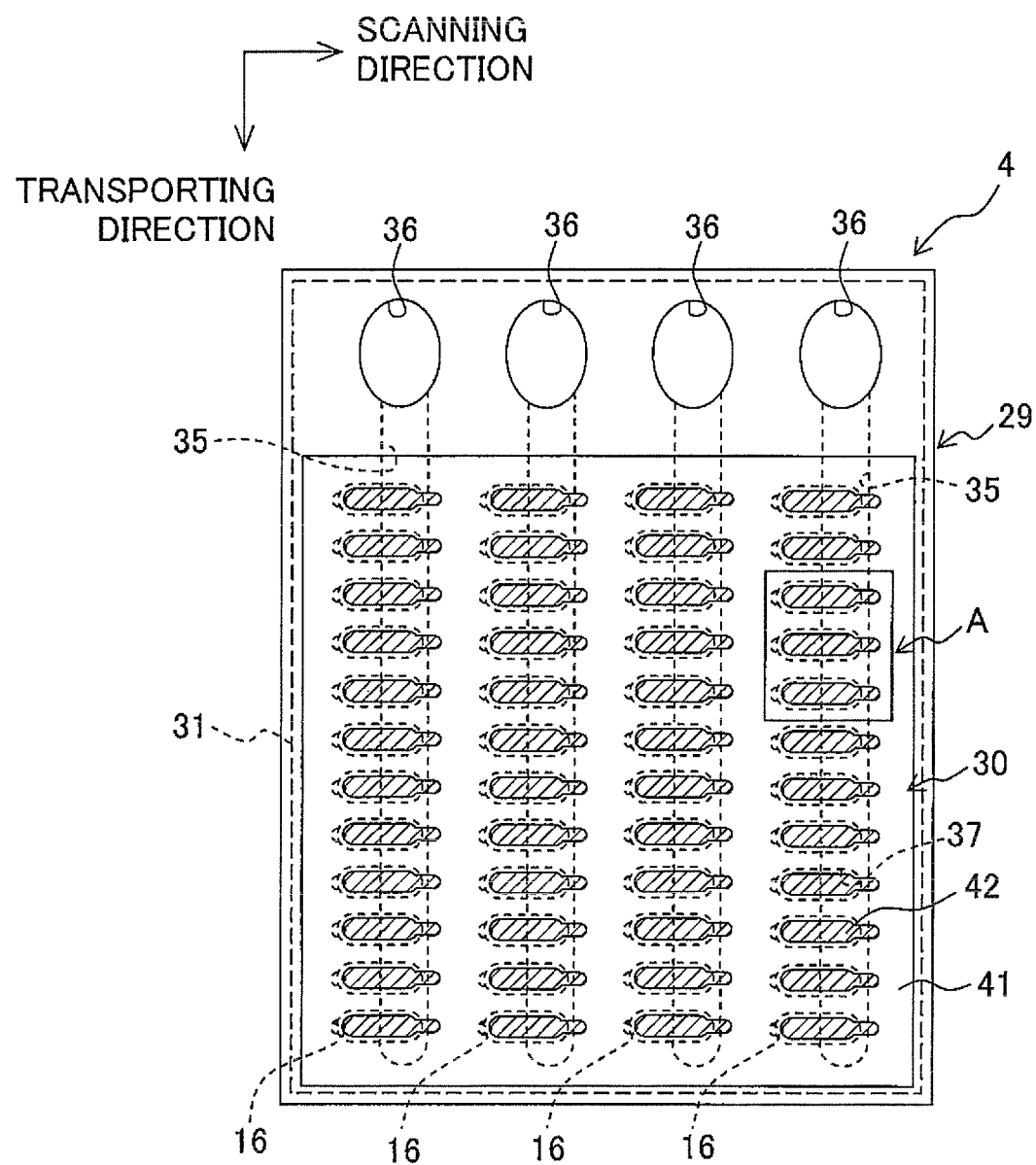
FIG. 2 shows a plan view illustrating an ink-jet head.
Figure 3:
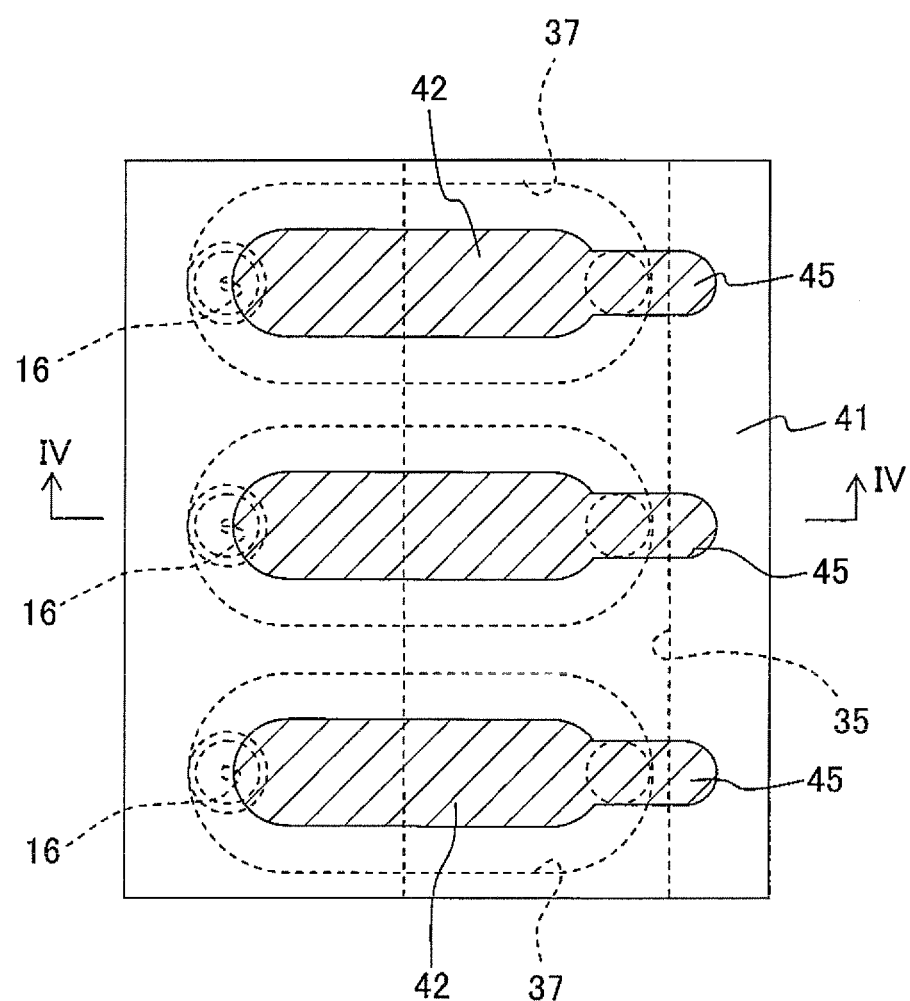
FIG. 3 shows a magnified view illustrating a portion A shown in FIG. 2.
Figure 4:
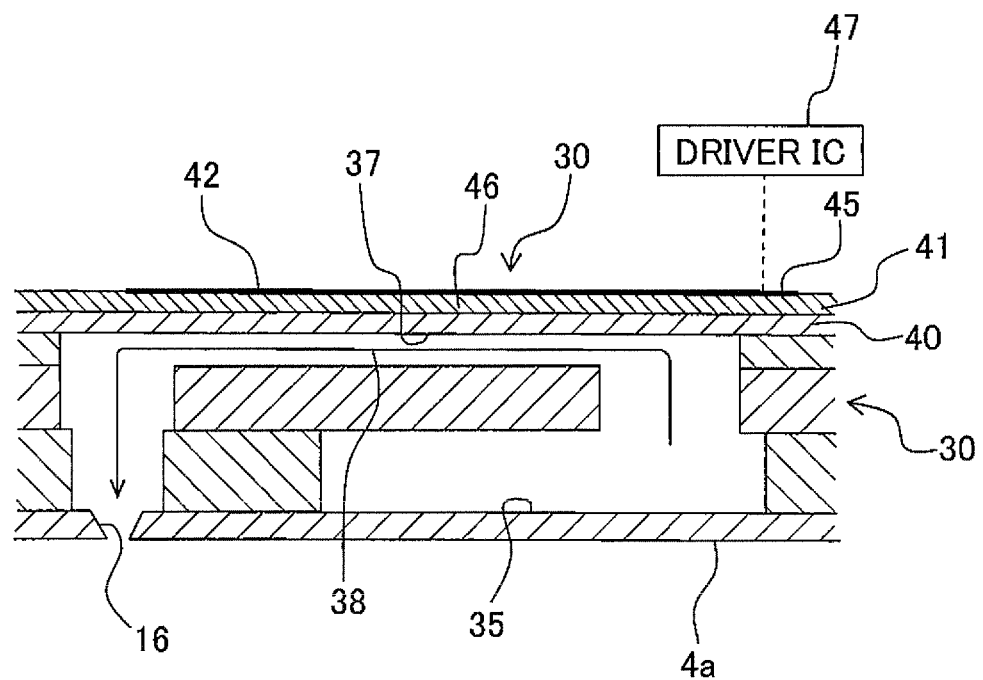
FIG. 4 shows a sectional view taken along a line IV-IV shown in FIG. 3.

Next, an explanation will be made about the structure of the ink-jet head 4. As shown in FIGS. 2 to 4, the ink-jet head 4 has a flow passage unit 29 which is formed with the plurality of nozzles 16 and a plurality of pressure chambers 37 communicated with the plurality of nozzles 16 respectively, and a piezoelectric actuator 30 which is arranged on the upper surface of the flow passage unit 29.

As shown in FIG. 4, the flow passage unit 29 includes a plurality of stacked metal plates. In this embodiment, four metal plates are stacked. As shown in FIG. 2, the plurality of nozzles 16 are arranged in the transporting direction to form four nozzle arrays aligned in the scanning direction. The four color inks (black, yellow, cyan, and magenta) are jetted respectively from the nozzles 16 belonging to the four nozzle arrays respectively.

The flow passage unit 29 includes the plurality of pressure chambers 37 which are communicated with the plurality of nozzles 16 respectively. The plurality of pressure chambers 37 are open on the upper surface of the flow passage unit 29. In this structure, the plurality of pressure chambers 37 are closed by a vibration plate 40 of the piezoelectric actuator 30 as described later on. The plurality of pressure chambers 37 are also arranged in four arrays corresponding to the four nozzle arrays.

Further, the flow passage unit 29 includes four manifolds 35 which extend in the transporting direction respectively and which supply the four color inks of black, yellow, cyan, and magenta to the pressure chambers arranged in the four arrays. The four manifolds 35 are connected to four ink supply ports 36 which are formed on the upper surface of the flow passage unit 29. Accordingly, as shown in FIG. 4, a plurality of individual flow passages 38, which extend from the manifolds 35 via the pressure chambers 37 to arrive at the nozzles 16, are formed in the flow passage unit 29.

As shown in FIGS. 2 to 4, the piezoelectric actuator 30 has the vibration plate 40 which is joined to the upper surface of the flow passage unit 29, a piezoelectric layer 41 which is formed on the upper surface of the vibration plate 40 so that the piezoelectric layer 41 is opposed to the plurality of pressure chambers 37, and a plurality of individual electrodes 42 which are arranged on the upper surface of the piezoelectric layer 41.

The vibration plate 40 is a plate member which is made of a metal such as stainless steel or the like and which is substantially rectangular as viewed in a plan view. The vibration plate 40 is joined to the upper surface of the flow passage unit 29 so that the plurality of pressure chambers 37 are covered therewith as described above. The vibration plate 40 constitutes parts of wall portions for comparting the plurality of pressure chambers 37. The vibration plate 40, which has the conductivity, is connected to driver IC 47 described later on, and the vibration plate 40 is always retained at the ground electric potential. The vibration plate 40 is arranged so that the piezoelectric layer 41 is interposed between the plurality of individual electrodes 42 and the vibration plate 40. The vibration plate 40 also serves as a common electrode to generate the electric field in the thickness direction in the piezoelectric layer 41.

The piezoelectric layer 41 is formed on the upper surface (surface disposed on the side opposite to the pressure chamber 37) of the vibration plate 40, and the piezoelectric layer 41 is composed of a piezoelectric material containing a main component of lead titanate zirconate (PZT) which is a solid solution of lead titanate and lead zirconate and which is a ferroelectric substance. The piezoelectric layer 41 is formed in a planar form to range over the plurality of pressure chambers 37.

The plurality of individual electrodes 42, which are one-size smaller than the pressure chambers 37 and which have substantially elliptic planar shapes, are formed on the upper surface of the piezoelectric layer 41. Each of the individual electrodes 42 is arranged at a position opposed to a central portion of the corresponding pressure chamber 37. Further, a plurality of connecting terminals 45 are led from the plurality of individual electrodes 42 respectively to areas not opposed to the pressure chambers 37. Unillustrated chip on film (COF), on which the driver IC 47 is mounted, is connected to the plurality of connecting terminals 45. COF is connected to the controller 8 of the ink-jet printer 1 via a head substrate 90 shown in FIG. 5.

Portions of the piezoelectric layer 41, which are interposed between the plurality of individual electrodes 42 and the vibration plate 40 to serve as the common electrode, are previously polarized in the thickness direction. Each of the portions serves as an active portion 46 which generates the deformation (piezoelectric strain) in the piezoelectric layer 41 when the voltage is applied between the individual electrode 42 and the vibration plate 40. When the electric potential difference (voltage) is generated between the individual electrode 42 and the vibration plate 40, the piezoelectric deformation (piezoelectric strain) is generated in the active portion 46. In accordance with the deformation, the pressure is applied to the ink contained in the pressure chamber 37 opposed to the active portion 46.

Next, an explanation will be made about the function of the piezoelectric actuator 30 during the ink jetting. When the electric potential of the individual electrode 42 is the ground electric potential which is the same as that of the vibration plate 40 in relation to each of the active portions 46 interposed between the individual electrodes 42 and the vibration plate 40 to serve as the common electrode, then the electric field does not act on the active portion 46, and the piezoelectric strain is not generated in the active portion 46. Starting from this state, when the predetermined driving electric potential is applied from the driver IC 47 to the individual electrode 42, then the predetermined voltage is applied between the individual electrode 42 and the vibration plate 40 which interpose the active portion 46, and the electric field in the thickness direction is allowed act on the active portion 46.

The direction of the electric field is parallel to the polarization direction of the piezoelectric layer 41. Therefore, the active portion 46 is shrunk in the in-plane direction perpendicular to the thickness direction. In this arrangement, the vibration plate 40, which is disposed on the lower side of the piezoelectric layer 41, is fixed to the plate which is disposed at the uppermost layer of the flow passage unit 29. Therefore, the portion of the vibration plate 40, which covers the pressure chamber 37, is deformed so that the portion protrudes toward the pressure chamber 37 (unimorph deformation) in accordance with the shrinkage in the in-plane direction of the piezoelectric layer 41 positioned on the upper surface of the vibration plate 40. In this situation, the volume in the pressure chamber 37 is decreased, and hence the ink pressure in the pressure chamber 37 is increased. The ink is jetted from the nozzle 16 communicated with the pressure chamber 37.

When the electric potential of the individual electrode 42 is the ground electric potential again, the electric field is not allowed to act on the active portion 46. Therefore, the active portion 46 is released from the deformed state. The vibration plate 40 returns to the original state (state in which the vibration plate 40 is parallel to the plate for constructing the flow passage unit 29).

[Maintenance Unit]

Next, the maintenance unit 6 will be explained. As shown in FIG. 1, the maintenance unit 6 is arranged at both end portions in the scanning direction while interposing the platen 2 in the casing 1a. The maintenance unit 6 includes, for example, a cap member 21 which is to be brought in tight contact with the lower surface of the ink-jet head 4 (ink-jetting surface 4a) to cover the plurality of nozzles 16, a suction pump 23 (sucking mechanism) which is connected to the cap member 21, a wiper 22 which wipes out any ink adhered to the ink-jetting surface 4a, and a liquid receiving member 39 (liquid receiving section) which receives the inks jetted from the nozzles 16.

The cap member 21 has a bottom wall section 21a which is composed of an insulative elastic material such as rubber or the like, and a lip section 21b which is provided at the outer circumferential portion of the bottom wall section 21a. The cap member 21 is driven so that the cap member 21 is moved upwardly and downwardly in the upward-downward direction by a cap driving mechanism 27 which includes a driving mechanism such as a cap driving motor 26 or the like shown in FIG. 8. The cap member 21 is movable to three positions at which the distances from the ink-jetting surface 4a differ. The three positions are (1) the capping position at which the cap member 21 is brought in tight contact with the ink-jetting surface 4a to cover the plurality of nozzles 16, (2) the uncapping position at which the cap member 21 is separated from the ink-jetting surface 4a to make no contact with the ink-jetting surface 4a, and (3) the empty suction position as the intermediate position between the capping position and the uncapping position at which the cap member 21 is separated from the ink-jetting surface 4a while providing a minute gap.

The cap member 21 is connected to the suction pump 23 via a suction port 28 which is formed through the bottom wall section 21a. The cap driving mechanism 27 moves the cap member 21 upwardly to the capping position. The suction pump 23 sucks the air contained in the cap member 21 in a state in which the cap member 21 is brought in tight contact with the ink-jetting surface 4a of the ink-jet head 4 so that the pressure is reduced in the space surrounded by the cap member 21 and the ink-jetting surface 4a. Accordingly, the inks are forcibly discharged to the cap member 21 from the plurality of nozzles 16 (suction purge). In this process, for example, the dust, the bubbles, and the inks (viscosity-increased inks) having high viscosities due to drying, which cause any defective jetting of the nozzles 16, are discharged from the nozzles 16 together with the inks.

When the suction purge is completed, then the cap driving mechanism 27 moves the cap member 21 downwardly to the empty suction position so that the cap member 21 is separated while providing a minute gap with respect to the ink-jetting surface 4a, and the interior of the cap member 21 is open to the atmospheric air. The inks, which are pooled or stored in the cap member 21 during the suction purge, are discharged by sucking the inks by means of the suction pump 23 (empty suction).

The distance of the gap, which is provided between the cap member 21 and the ink-jetting surface 4a at the empty suction position, is a distance of such a degree that the ink bridge is not disconnected or discontinued. The ink bridge herein means the ink which is connected or continued between the cap member 21 (lip section 21b) and the ink-jetting surface 4a. In other words, the cap member 21 is not brought in contact with the ink-jetting surface 4a, but the cap member 21 is extremely close to the ink-jetting surface 4a. Accordingly, even when the cap member 21 is moved to the uncapping position and it is intended to suck and discharge the ink pooled or stored in the cap member 21, then the ink is prevented from being scattered to the surroundings, which would be otherwise caused such that the ink bridge is disconnected or discontinued by the force brought about when the cap member 21 is separated from the ink-jetting surface 4a.

The cap member 21 is also used for any purpose other than the suction purge described above. For example, the cap member 21 is also used during a rest period in which the ink-jet head 4 is not used (state in which no ink is jetted). The cap member 21 is brought in contact with the ink-jetting surface 4a during the rest period of the ink-jet head 4 to cover the openings of the plurality of nozzles 16. Thus, the nozzles 16 are protected, and the inks in the nozzles 16 are suppressed from being dried. The cap member 21 is also used during the standstill flushing as described later on.

As shown in FIG. 1, the wiper 22 is provided upstandingly at a position deviated toward the platen 2 as compared with the cap member 21. The carriage 3 is moved in the scanning direction in a state in which the forward end of the wiper 22 is brought in contact with the ink-jetting surface 4a of the ink-jet head 4 after the suction purge. Accordingly, the wiper 22 wipes out any ink adhered to the ink-jetting surface 4a.

The ink-jet printer 1 of the embodiment of the present teaching performs two types of the flushing (acceleration flushing and standstill flushing) at appropriate timings. The flushing herein resides in such an operation that the inks are intermittently jetted from the nozzles 16 in order to prevent the inks in the nozzles 16 from being dried.

The acceleration flushing resides in such an operation that the inks are jetted from the nozzles 16 toward the liquid receiving member 39. In this procedure, the ink-jet head 4 is not operated such that the ink-jet head 4 stops at a position opposed to the liquid receiving member 39 to jet the inks from the nozzles 16. The ink-jet head 4 jets the inks toward the liquid receiving member 39 from a position deviated obliquely with respect to the liquid receiving member 39 while traveling in the scanning direction from the recording area toward the side on which the liquid receiving member 39 is positioned. In this way, in the acceleration flushing, the ink-jet head 4 jets the inks while traveling without causing the stop. Therefore, it is possible to shorten the period of time required for the flushing.

The standstill flushing resides in such an operation that the inks are jetted from the nozzles 16 toward the cap member 21 as described later on. In this procedure, the ink-jet head 4 stops at a position opposed to the cap member 21, and the ink-jet head 4 jets the inks toward the cap member 21 in a state in which the cap member 21 is positioned at the empty suction position. That is, the acceleration flushing and the standstill flushing are different from each other not only in relation to the area in which the inks are jetted from the nozzles 16 but also in relation to whether or not the inks are jetted from the nozzles 16 during the traveling of the ink-jet head 4. The flushing as described above is performed, for example, before the recording operation for recording an image on the recording paper P, during the recording operation, and/or immediately after the suction purge. The standstill flushing, which is included in the two types of the flushing according to the embodiment of the present teaching, corresponds to the flushing according to the present teaching.

[Circuit Arrangement of Head Substrate]

Figure 6:
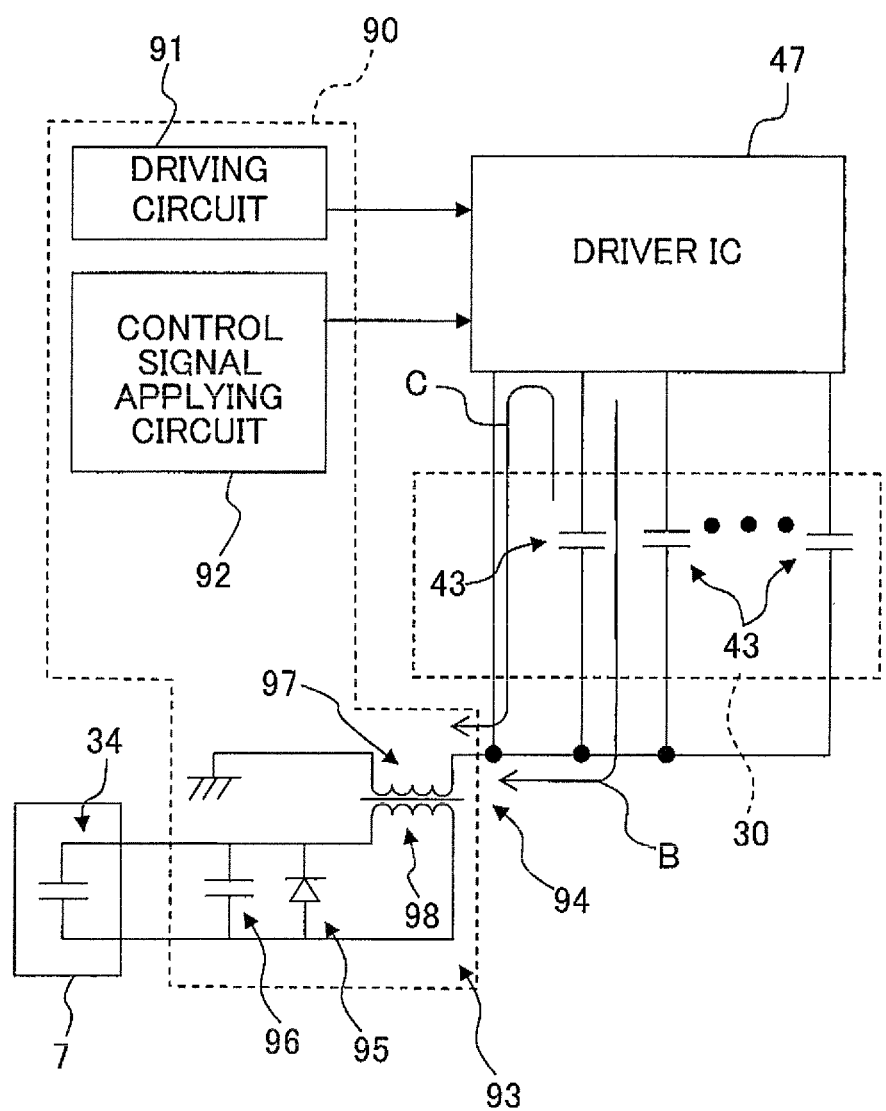
FIG. 6 shows an equivalent circuit diagram of a piezoelectric actuator and a circuit diagram of a head substrate.

Next, a circuit arrangement of the head substrate 90 will be explained. As shown in FIG. 6, the head substrate 90 has, for example, a driving circuit 91 (driving device), a control signal applying circuit 92, and the electric current recovery circuit 93 (energy recovery mechanism). The active portion 46 of the piezoelectric layer 41, which is provided in the piezoelectric actuator 30, which is interposed between the individual electrode 42 and the vibration plate 40, and which is polarized, can be regarded as a capacitor 43 to perform the electric charging and discharging. The active portion 46 of the piezoelectric layer 41 is piezoelectrically deformed in accordance with the electric charging and discharging.

The driving circuit 91 supplies the electric power to the driver IC 47 in order to perform the driving. The control signal applying circuit 92 outputs the control signal to the driver IC 47 to switch the ON/OFF state of an unillustrated switching element included in the driver IC 47 so that the switching of the electric charging and discharging states of the capacitor 43 is controlled. The capacitor 43 is operated depending on the ON/OFF state of the switching element such that the electric current is allowed to flow along with a route shown by an arrow B in FIG. 6 to cause the electric charging, or the electric current is allowed to flow along with a route shown by an arrow C in FIG. 6 to cause the electric discharging.

The electric current recovery circuit 93 has a transformer 94, a rectifying diode 95, and a capacitor 96, and the electric current recovery circuit 93 is connected to the mist adsorbing device 7. One terminal of a primary winding 97 of the transformer 94 is connected to a terminal of the capacitor 43 disposed on the side opposite to the side to which the electric current is supplied from the driver IC 47. The other terminal of the primary winding 97 is connected to the ground (GND). The transformer 94 includes the rectifying diode 95 and the capacitor 96 which are connected in parallel between terminals of a secondary winding 98. The capacitor 96 is provided in order to remove any noise.

When the unillustrated switching element of the driver IC 47 performs the switch operation, and the driving electric potential is applied to the individual electrode 42, then the capacitor 43 is charged, and the active portion 46 is piezoelectrically deformed. In the electric current recovery circuit 93, the electric current in the direction of the arrow B shown in FIG. 6, which is supplied from the driving circuit 91 via the driver IC 47 to the capacitor 43 during the charging of the capacitor 43, flows to the primary winding 97 of the transformer 94. Accordingly, the electric current flows through the secondary winding 98. On the other hand, when the ground electric potential is applied to the individual electrode 42, then the capacitor 43 is discharged, and the active portion 46 is released from the deformation. In the electric current recovery circuit 93, the electric current in the direction of the arrow C shown in FIG. 6, which is discharged from the capacitor 43 during the discharging of the capacitor 43, flows to the primary winding 97 of the transformer 94. Accordingly, the electric current flows through the secondary winding 98. The electric current, which flows through the secondary winding 98, is supplied to the mist adsorbing device 7. That is, the electric current is supplied from the driving circuit 91 to drive the active portion 46 (capacitor 43), and thus a part of the electric current for driving the active portion 46 is recovered by the electric current recovery circuit 93 so that the part of the electric current is supplied to the mist adsorbing device 7. In this arrangement, the winding ratio between the primary winding 97 and the secondary winding 98 is appropriately set by using the transformer 94, and thus it is possible to increase the electric current to be supplied to the mist adsorbing device 7. Further, since the transformer 94 is arranged between the active portion 46 and the mist absorbing device 7, it is possible to isolate between the active portion 46 and the mist absorbing device 7, and to achieve the transformer-coupling.

[Arrangement of Mist Adsorbing Device]

Figure 5:
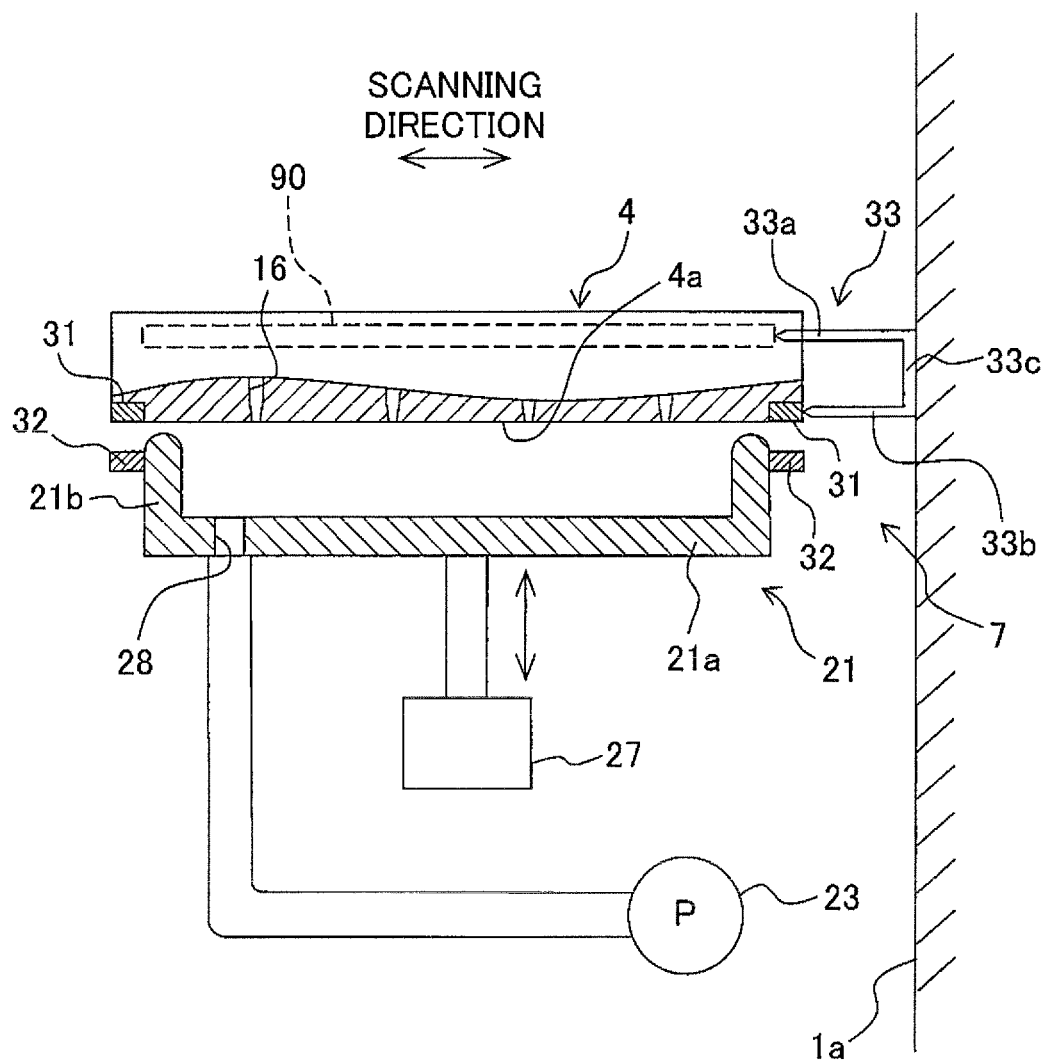
FIG. 5 shows a sectional view illustrating the ink-jet head and a cap member in a capping state of the cap member.

Next, the mist adsorbing device 7 will be explained. As shown in FIG. 5, the mist adsorbing device 7 has a first electrode 31, a second electrode 32, and a needle electrode 33 (third electrode member). As shown in FIGS. 1 and 2, the first electrode 31 is provided on the lower surface of the flow passage unit 29 while interposing an insulating layer. The first electrode 31 surrounds the area in which the plurality of nozzles 16 are formed. The first electrode 31 has a flat surface which is continued to the ink jetting surface 4*a*. The first electrode 31 and the flow passage unit 29 are insulated from each other.

The second electrode 32 surrounds the outer circumferential portion of the lip section 21*b* of the cap member 21. The second electrode 32 is retained at the ground electric potential. As shown in FIG. 5, the second electrode 32 is opposed to the surface continued to the ink-jetting surface 4*a*, of the first electrode 31 provided on the ink jet head 4 while providing a minute gap, when the ink-jet head 4 is opposed to the cap member 21 and the cap member 21 is positioned at the empty suction position.

The needle electrode 33 is fixed to the inner wall surface disposed on the side (right side as viewed in FIG. 1) on which the cap member 21 is provided in relation to the scanning direction of the casing 1*a*. The needle electrode 33 has a first needle section 33*a* and a second needle section 33*b* which are arranged while providing a spacing distance in the upward-downward direction, and a connecting section 33*c* which is fixed to the inner wall surface of the casing 1*a* and which connects the first needle section 33*a* and the second needle section 33*b*.

The forward end of the first needle section 33*a* is electrically connected by being brought in contact with the positive (plus) side terminal of the secondary winding 98 of the transformer 94 of the head substrate 90, when the ink-jet head 4 is positioned at the position opposed to the cap member 21. The forward end of the second needle section 33*b* is electrically connected by being brought in contact with the first electrode 31 of the mist adsorbing device 7 when the ink-jet head 4 is positioned at the position opposed to the cap member 21.

That is, when the ink-jet head 4 is positioned at the position opposed to the cap member 21, the positive side terminal of the secondary winding 98 of the transformer 94 and the first electrode 31 of the mist adsorbing device 7 are in conduction via the needle electrode 33 to provide such a state that the electric current recovery circuit 93 and the mist adsorbing device 7 are electrically connected to one another, When the ink-jet head 4 is not opposed to the cap member 21, the positive side terminal of the secondary winding 98 of the transformer 94 and the First electrode 31 of the mist adsorbing device 7 are insulated from each other by being separated from the needle electrode 33 to provide such a state that the electric current recovery circuit 93 and the mist adsorbing device 7 are not electrically connected to one another.

Figure 7A:
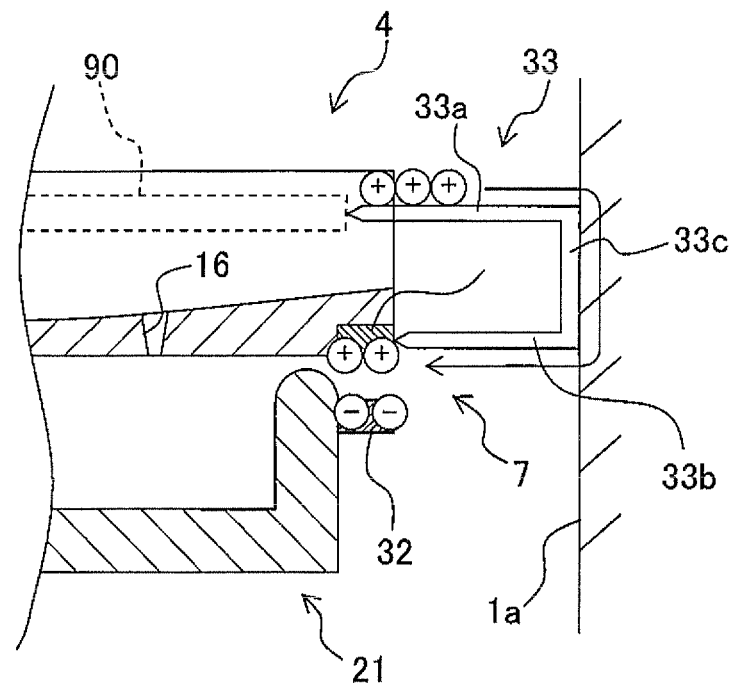
FIG. 7A shows a sectional view illustrating the ink-jet head to explain the electrification.

The first electrode 31 and the second electrode 32 are opposed to one another while providing a minute gap to form the capacitor 34 (electric charge accumulating mechanism, see FIG. 6) when the ink-jet head 4 is opposed to the cap member 21 and the cap member 21 is positioned at the empty suction position. As shown in FIG. 7A, when the electric current is supplied from the head substrate 90 (electric current recovery circuit 93) to the first electrode 31, the capacitor 34, which is formed by the first electrode 31 and the second electrode 32, is charged. The positive (plus) electric charge is accumulated in the first electrode 31, and the negative (minus) electric charge is accumulated in the second electrode 32.

Figure 7B:
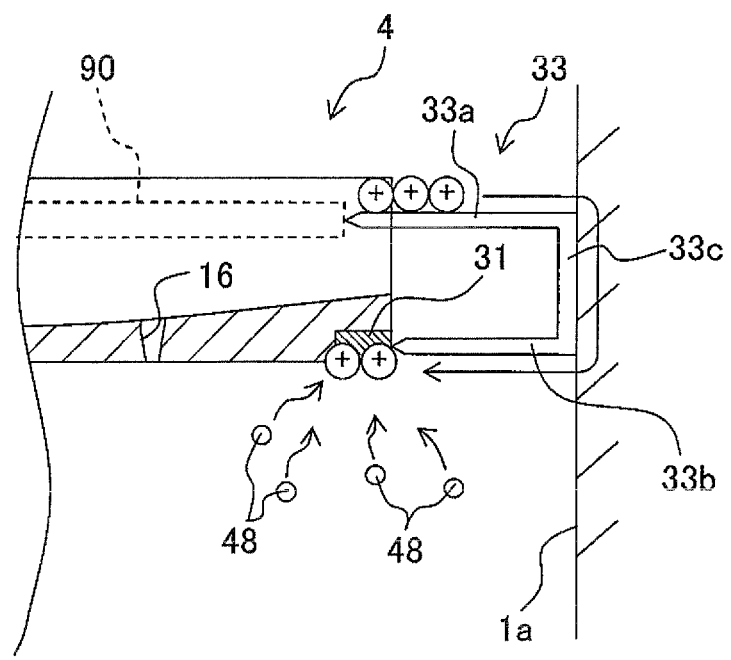
FIG. 7B shows a sectional view illustrating the ink-jet head to explain the electrostatic adsorption.

After that, as shown in FIG. 7B, when the cap member 21 is moved from the empty suction position to the uncapping position, then the second electrode 32 is separated from the first electrode 31, and the positive electric charge is still accumulated in the first electrode 31. The first electrode 31, in which the positive electric charge is accumulated and which is electrically charged positive, attracts and electrostatically adsorbs the mist 48 which is electrically charged negative and which floats therearound, by means of the Coulomb's force.

In this arrangement, the amount of electric charge, which is accumulated in the capacitor 34 formed by the first electrode 31 and the second electrode 32, is directly proportional to the capacitance of the capacitor 34 when the voltage, which is applied to the capacitor 34, is constant. The capacitance of the capacitor 34 is inversely proportional to the distance between the first electrode 31 and the second electrode 32. Therefore, in order to increase the electric charge amount accumulated in the capacitor 34, it is necessary that the distance between the first electrode 31 and the second electrode 32 is narrowed as much as possible. In view of the above, the second electrode 32 is provided on the cap member 21 which is capable of making approach/separation with respect to the ink-jet head 4. Thus, the distance between the first electrode 31 and the second electrode 32 can be narrowed, and the second electrode 32 can be separated from the first electrode 31.

[Control of Printer]

Figure 8:
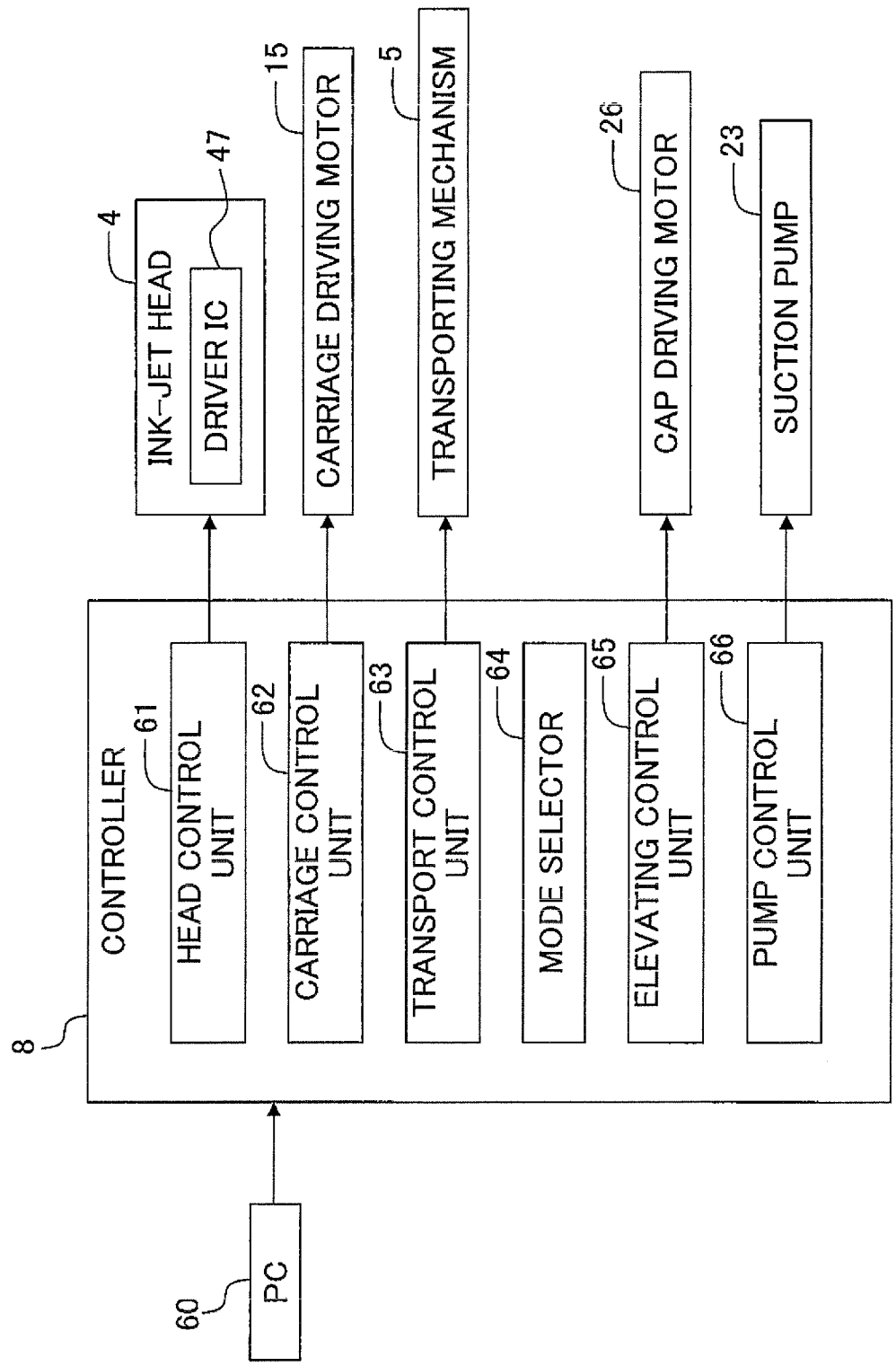
FIG. 8 shows a block diagram schematically illustrating a control system of the printer.

Next, an explanation will be made with reference to a block diagram shown in FIG. 8 about a control system of the ink jet printer 1 mainly including the controller 8. The controller 8 of the ink-jet printer 1 shown in FIG. 8 includes a microcomputer having, for example, Central Processing Unit (CPU), Read Only Memory (ROM) which stores, for example, various programs and data for controlling the operation of the entire ink-jet printer 1, and Random Access Memory (RAM) which temporarily stores, for example, data processed by CPU, wherein various types of the control are performed as explained below by executing the program stored in ROM by means of CPU. Alternatively, the controller 8 may be constructed by any hardware in which various circuits including a calculating circuit are combined with each other.

The controller 8 includes a head control unit 61, a carriage control unit 62, a transport control unit 63, a mode selector 64, an elevating control unit 64, and a pump control unit 66.

The head control unit 61 controls the ink-jet head 4 on the basis of the recording data inputted from an external apparatus such as PC 60 or the like so that the inks are jetted toward the recording paper P to record, for example, a desired image and/or letters on the recording paper P. The head control unit 61 controls the ink-jet head 4 during the two types of the flushing described above so that the inks are jetted toward the liquid receiving member 39 or the cap member 21. The carriage control unit 62 controls the carriage driving motor 15 so that the carriage 3 is moved in the scanning direction. The transport control unit 63 controls the transporting mechanism 5 so that the recording paper P is transported.

The mode selector 64 selects the printing mode on the basis of the resolution of the recording data inputted from PC 60.

The printing mode includes a plurality of modes as determined depending on the degree of the printing quality requested by a user. In this embodiment, the mode selector 64 can select two modes of the high resolution recording mode and the low resolution recording mode. The sizes of the liquid droplets jetted from the ink-jet head 4 are smaller in the high resolution recording mode as compared with the low resolution recording mode. In the high resolution recording mode as described above, the mist tends to appear in the casing 1*a* as compared with the low resolution recording mode, because the sizes of the liquid droplets to be jetted are small. Further, in the high resolution recording mode, the recording time period is longer than that in the low resolution recording mode.

The elevating control unit 65 controls the cap driving motor 26 so that the cap member 21 is moved upwardly/downwardly. The pump control unit 66 controls the suction pump 23 so that the suction purge and the empty suction are performed.

[Recording Operation]

In the ink-jet printer 1 according to this embodiment, the standstill flushing is performed as described above, and then the inks are jetted to the recording paper P to perform the recording operation in order to record, for example, a desired image and/or letters. The standstill flushing and the acceleration flushing are performed at a predetermined flushing cycle during the recording operation. An explanation will be made below about the procedure in which the standstill flushing is performed followed by any operation until the recording operation is completed.

At first, when the recording data is inputted from PC 60, the printing mode is selected by the mode selector 64. The carriage driving motor 15 is controlled by the carriage control unit 62 to move the ink-jet head 4 to the position opposed to the cap member 21, and the head substrate 90 and the first electrode 31 (electric current recovery circuit 93) are allowed to be in conduction by the aid of the needle electrode 33. After that, the cap driving motor 26 is controlled by the elevating control unit 65 to move the cap member 21 to the empty suction position. The ink-jet head 4 is controlled by the head control unit 61 to perform the standstill flushing by jetting the inks from the nozzles 16. Accordingly, the positive electric charge is accumulated in the first electrode 31, and the first electrode 31 is electrically charged positive. In this procedure, when the printing mode, which is selected by the mode selector 64, is the high resolution recording mode, the number of times of the jetting of the inks from the nozzles 16 during the standstill flushing (number of times of execution of the flushing) is increased as compared with when the printing mode is the low resolution recording mode.

In relation thereto, when the mist, which is electrically charged negative, is electrostatically adsorbed by the first electrode 31 which is electrically charged positive, the positive electric charge, which is accumulated in the first electrode 31, is neutralized between the first electrode 31 and the mist, and the positive electric charge is decreased. In this process, the recording time period is long, and the diameters of the liquid droplets jetted from the nozzles 16 are small in the high resolution recording mode. Therefore, a large amount of the mist is generated as compared with the low resolution recording mode. When the large amount of the mist is generated as described above, then the electric charge, which is accumulated in the first electrode 31, is quickly decreased, and the force for adsorbing the mist is quickly decreased. In view of the above, the number of times of the jetting of the inks from the nozzles 16 is increased during the standstill flushing in the case of the high resolution recording mode. Thus, it is possible to increase the electric charge amount (electrification amount) of the first electrode 31. Accordingly, it is possible to maintain the state in which the force for adsorbing the mist is enhanced, during the recording operation.

After that, the carriage driving motor 15 is controlled by the carriage control unit 62 so that it is intended to move the ink-jet head 4 to the recording area, and thus the head substrate 90 and the first electrode 31 are insulated while being separated from the needle electrode 33. After that, the cap driving motor 26 is controlled by the elevating control unit 65 so that the cap member 21 is moved to the uncapping position.

When the head substrate 90 and the first electrode 31 are allowed to be in conduction to perform the standstill flushing, then the electric current flows between the first electrode 31 and the second electrode 32, and the electric potential difference is generated. If the second electrode 32 is separated from the first electrode 31 in a state in which the electric potential difference is generated between the first electrode 31 and the second electrode 32, the electric potential difference is increased. In view of the above, the second electrode 32 is separated from the first electrode 31 after insulating the head substrate 90 and the first electrode 31 after the standstill flushing. Accordingly, it is possible to eliminate such a fear that the high voltage may enter the head substrate 90 to cause any malfunction or failure due to the overvoltage.

If the cap member 21 is positioned at the capping position to make contact with the ink-jetting surface 4*a* when the standstill flushing is performed, then it is difficult to insulate the head substrate 90 and the first electrode 31 while being separated from the needle electrode 33 before separating the cap member 21 from the ink-jetting surface 4*a*. On the contrary, in the embodiment of the present teaching, the cap member 21 is positioned at the empty suction position when the standstill flushing is performed. Therefore, the distance between the first electrode 31 and the second electrode 32 can be made minute as compared with such a case that the cap member 21 is disposed at the uncapping position. The second electrode 32 can be separated from the first electrode 31 after insulating the head substrate 90 and the first electrode 31 after the standstill flushing as described above.

The driver IC 47 of the ink-jet head 4, the carriage driving motor 15, and the transporting mechanism 5 are controlled respectively on the basis of the recording data inputted from PC 60 to perform the recording operation for the recording on the recording paper P. In this procedure, the mist, which is generated by jetting the inks from the nozzles 16 onto the recording paper P, can be attracted and electrostatically adsorbed to the first electrode 31 which is electrically charged positive, by means of the Coulomb's force.

The flushing is also performed at predetermined flushing cycles during the printing. In the embodiment of the present teaching, the acceleration flushing is usually performed in order to shorten the period of time required for the flushing. However, the standstill flushing is performed at every several cycles without performing the acceleration flushing. In this procedure, when the printing mode, which is selected by the mode selector 64, is the high resolution recording mode, the interval for performing the standstill flushing is shortened as compared with when the printing mode is the low resolution recording mode.

The setting can be made, for example, as follows. The following settings are just examples, and the present teaching is not limited thereto.

<High Resolution Recording Mode>

The standstill flushing is performed once every three cycles without performing the acceleration flushing.

<Low Resolution Recording Mode>

The standstill flushing is performed once every five cycles without performing the acceleration flushing.

In relation thereto, as described above, in the case of the high resolution recording mode, the electric charge accumulated in the first electrode 31 is quickly decreased, and the force for adsorbing the mist is quickly lowered as compared with the low resolution recording mode. In view of the above, in the case of the high resolution recording mode, the recording operation can be performed in a state in which the first electrode 31 is electrically charged sufficiently with a large electric charge amount by increasing the frequency of the flushing. It is possible to maintain a state in which the force for adsorbing the mist is enhanced, during the recording operation.

According to the ink-jet printer 1 of the embodiment of the present teaching, a part of the electric current, which is supplied from the driving circuit 91 when the ink-jet head 4 is driven in order to jet the inks from the nozzles 16, is recovered and effectively utilized in order to drive the mist adsorbing device 7. Accordingly, it is unnecessary to provide any driving circuit exclusively usable to drive the mist adsorbing device 7. It is possible to enhance the energy efficiency, and it is possible to reduce the cost.

The standstill flushing is used as the operation for driving the ink-jet head 4 in order to drive the mist adsorbing device 7 as described above, without using the operation for jetting the inks onto the recording paper P. Further, the cap member 21 is positioned at the empty suction position when the standstill flushing is performed. Therefore, the first electrode 31 and the second electrode 32 can be allowed to make approach closely to one another until a minute distance is provided therebetween, as compared with such a case that the cap member 21 is positioned at the uncapping position. Therefore, it is possible to increase the capacitance of the capacitor 34 formed between the first electrode 31 and the second electrode 32, and it is possible to increase the electric charge amount accumulated in the first electrode 31.

When the cap member 21 is separated thereafter from the ink-jetting surface 4a, then the first electrode 31 and the second electrode 32 are separated from each other, and the electric charge is still accumulated in the first electrode 31. It is possible to electrostatically adsorb a large amount of the mist to the first electrode 31 provided on the ink-jet head 4.

In the meantime, if the cap member 21 is positioned at the capping position, and the standstill flushing is performed in a hermetically closed state in which the nozzles 16 are covered with the cap member 21, then it is feared that the inks may be hardly jetted from the nozzles 16. In view of the above, when the standstill flushing is performed at the empty suction position, then the inks are jetted from the nozzles 16, and the nozzles 16 can be prevented from being dried more reliably. In some cases, it is intended to drive the ink-jet head 4 in order to allow the electric current to flow through the mist adsorbing device 7, but it is intended not to jet the inks from the nozzles 16 so much so that the inks are not consumed. For example, when the number of times of the jetting of the inks from all of the nozzles 16 is large in the recording operation, and it is unnecessary to jet the inks by the flushing in relation to all of the nozzles 16, then the cap member 21 is positioned at the capping position, and it is possible to perform the standstill flushing in a hermetically closed state in which the nozzles 16 are covered with the cap member 21.

The first electrode 31 and the second electrode 32 are allowed to make approach to one another until a minute distance is provided, by utilizing the upward/downward movement of the cap member 21 so that the electric charge amount is increased. Therefore, it is unnecessary to distinctly provide any structure or arrangement for allowing the first electrode 31 and the second electrode 32 to make approach to one another until a minute distance is provided. It is possible to miniaturize the ink-jet printer 1, and it is possible to reduce the cost.

Figure 9:
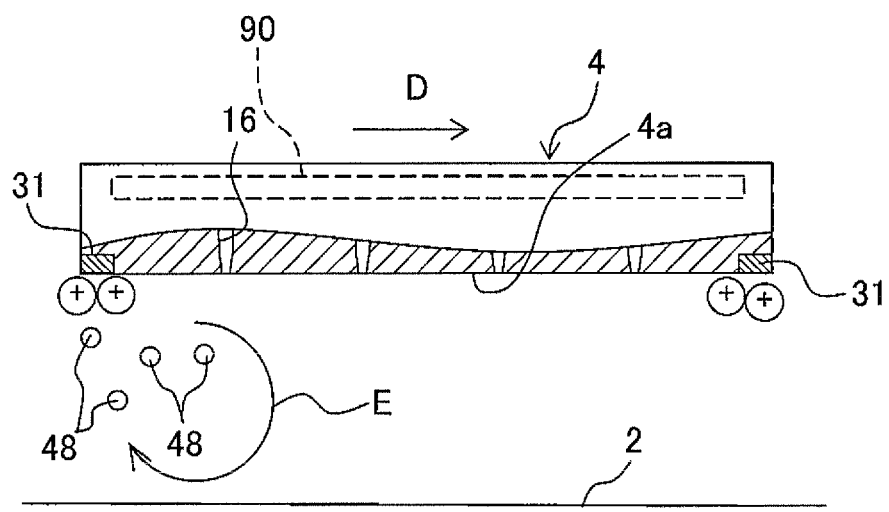
FIG. 9 shows a sectional view illustrating the ink-jet head to explain the floating state of the mist generated during the recording operation.

The first electrode 31 surrounds the area in which the plurality of nozzles 16 are formed on the lower surface of the flow passage unit 29. Accordingly, it is easy to adsorb the mist generated by jetting the inks from the nozzles 16. Specifically, as shown in FIG. 9, when the inks are jetted from the nozzles 16 while moving the ink-jet head 4 in one direction (direction of an arrow D, rightward direction as viewed in FIG. 5) in the scanning direction during the recording operation, the mist, which is generated by jetting the inks from the nozzles 16, is allowed to float while forming a vortex flow as indicated by an arrow E on the downstream side in the direction in which the ink-jet head 4 is moved. When the first electrode 31 surrounds the area in which the plurality of nozzles 16 are formed, the mist can be easily adsorbed to the first electrode 31, for example, even when the ink jet head 4 is constructed so that the two-way printing (printing in both directions) can be performed and the mist is generated by jetting the inks during the periods in which the ink-jet head 4 travels in the two-way directions (both directions).

Further, the first electrode 31 defines a flat surface continued to the ink-jetting surface 4a. When the ink-jetting surface 4a is wiped out by the wiper 22, the mist, which is adsorbed to the first electrode 31, can be also wiped out.

The piezoelectric actuator 30 drives the object by utilizing the piezoelectric effect. Therefore, the piezoelectric actuator 30 is capacitive, and a large amount of the electric current is required during the charging in order to pool or store the electric charge. Further, after the completion of the charging, the discharging is performed to uselessly waste the electric current. Therefore, the energy efficiency is relatively low. In view of the above, a part of the electric current for driving the piezoelectric actuator 30 is used for the mist adsorbing device 7. Accordingly, the electric current, which is required for the driving, can be sufficiently supplied to the mist adsorbing device 7 as well. It is possible to enhance the energy efficiency.

Next, an explanation will be made about modified embodiments to which various modifications are applied to the embodiment described above. However, the components or parts, which are constructed in the same manner as those of the embodiment described above, are designated by the same reference numerals, any explanation of which will be appropriately omitted.

[First Modified Embodiment]

In the embodiment described above, the second electrode 32 is provided on the cap member 21 which is movable to make separation and approach with respect to the ink-jetting surface 4a, in relation to the structure or arrangement for allowing the second electrode 32 to make approach with respect to the first electrode 31 which is provided on the ink-jet head 4. However, the second electrode 32 may be provided on any member other than the cap member 21.

Figure 10A:
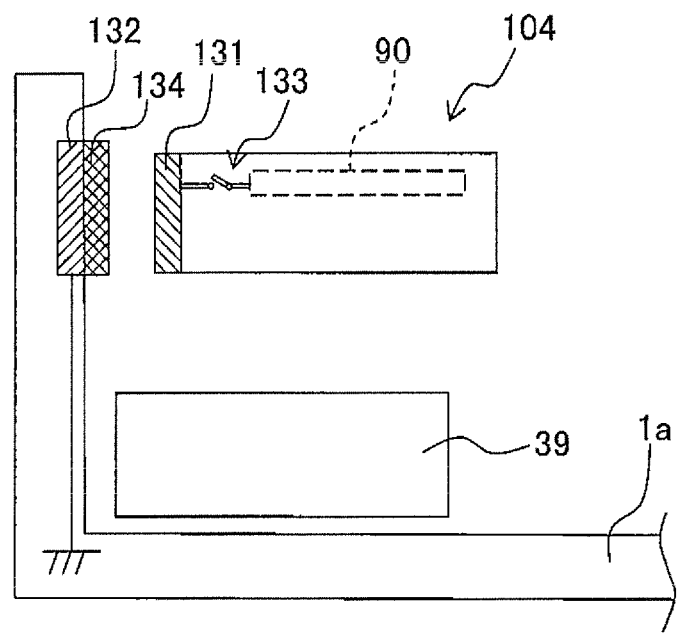
FIGS. 10A and 10B show plan views illustrating an ink-jet head and a liquid-receiving member in a first modified embodiment.

For example, as shown in FIG. 10A, a first electrode 131 is provided on a side surface of an ink jethead 104 disposed on the side of the liquid receiving member 39 in relation to the scanning direction. A second electrode 132 is fixed to an inner wall surface of the casing 1a disposed on the side of the liquid receiving member 39 in relation to the scanning direction, and the second electrode 132 is retained at the ground electric potential. Further, a dielectric 134 is arranged on a surface of the second electrode 132 opposed to the first electrode 131.

The first electrode 131 and the head substrate 90 (electric current recovery circuit 93) are connected by the aid of a switch 133 intervening therebetween.

Figure 10B:
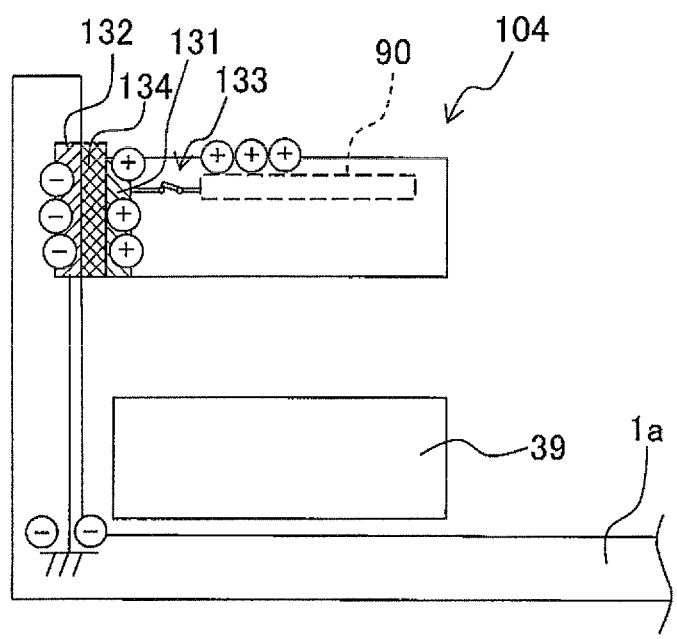

As shown in FIG. 10B, the ink-jet head 104 is firstly moved to the position (left end as viewed in FIG. 1) opposed to the liquid receiving member 39 in a state in which the switch 133 is turned OFF during the standstill flushing. Accordingly, the first electrode 131 is opposed to the second electrode 132 while providing a minute gap with the dielectric 134 intervening therebetween. After that, the ink-jet head 104 is driven in a state in which the switch 133 is turned ON so that the inks are jetted from the nozzles 16 with respect to the liquid receiving member 39.

Accordingly, when the electric current is supplied from the head substrate 90 (electric current recovery circuit 93) to the first electrode 131, then the positive electric charge is accumulated in the first electrode 131, and the negative electric charge is accumulated in the second electrode 132. In this procedure, owing to the dielectric 134 intervening between the first electrode 131 and the second electrode 132, the capacitor 34, which is formed by the first electrode 131 and the second electrode 132, has the increased capacitance, and the electric charge amount is increased. After that, the switch 133 is turned OFF, and the ink-jet head 104 is moved to the recording area.

Accordingly, the first electrode 131 can be also electrically charged while performing the flushing. Further, when the ink-jet head 104 is positioned until arrival at the end of the interior of the casing 1a to provide the minute gap between the second electrode 132 which is provided on the casing 1a and the first electrode 131 which is provided on the ink jet head 104, then the amount of the electric charge, which is electrified on the first electrode 131, can be increased, and it is possible to electrostatically adsorb a large amount of the mist. In this procedure, owing to the dielectric 134 intervening between the first electrode 131 and the second electrode 132, it is possible to increase the amount of the electric charge with which the first electrode 131 can be electrified. Therefore, it is not necessarily indispensable that the distance of the gap between the first electrode 131 and the second electrode 132 should be excessively decreased in order to increase the capacitance. It is easy to perform the position control in relation to the distance between the first electrode 131 and the second electrode 132.

In this modified embodiment, the switch 133 is turned OFF to insulate the head substrate 90 and the first electrode 131 before the first electrode 131 and the second electrode 132 are separated from each other by moving the ink-jet head 104 to the recording area. Therefore, it is possible to eliminate such a fear that the high voltage, which is generated by separating the first electrode 131 and the second electrode 132, may enter the ink-jet head 104 to cause any malfunction or disorder due to the overvoltage. The dielectric 134 may be provided on the side of the first electrode 131 without providing the dielectric 134 on the side of the second electrode 132. In this modified embodiment, it is also allowable that the dielectric is not provided. Of course, it is also allowable that any dielectric is provided between the first electrode 31 and the second electrode 32 in the embodiment described above.

[Second Modified Embodiment]

Figure 11:
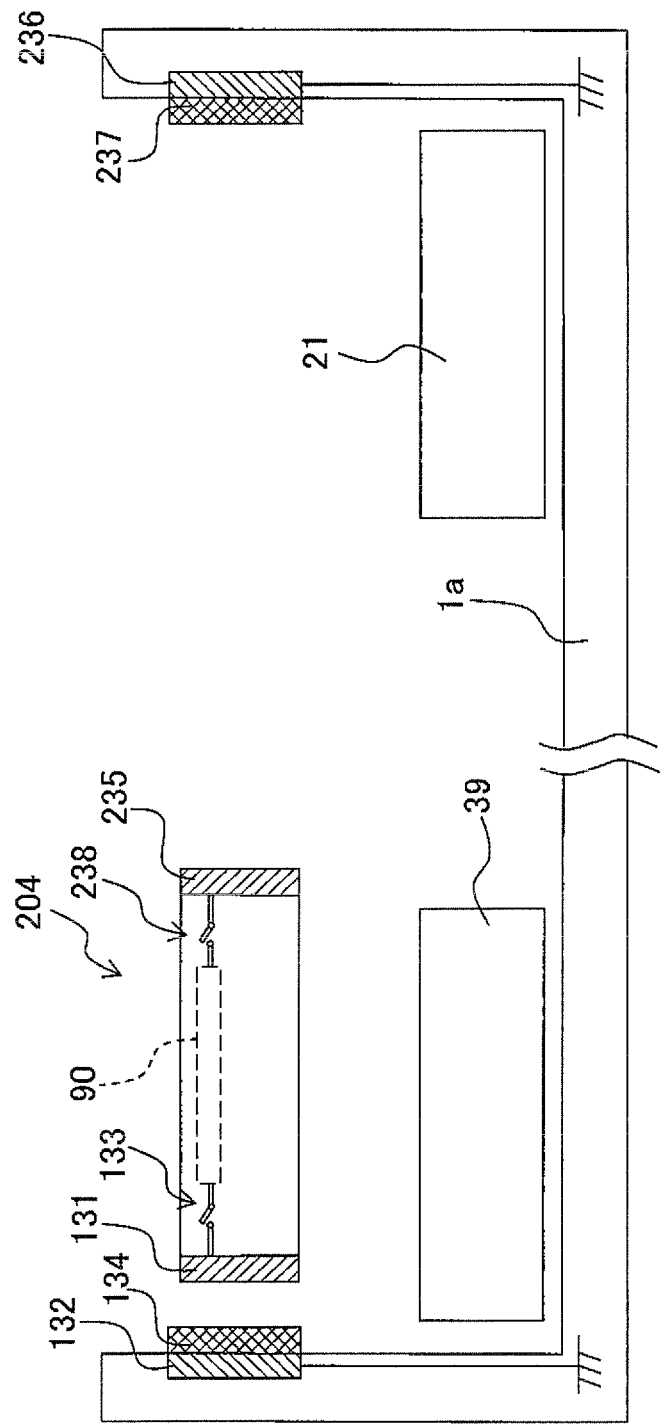
FIG. 11 shows a plan view illustrating an ink-jet head, a liquid-receiving member, and a cap member in a second modified embodiment.

As shown in FIG. 11, another modified embodiment is available in addition to the first modified embodiment described above, wherein a first electrode 235 is provided on a side surface of an ink-jet head 204 disposed on the side of the cap member 21 in relation to the scanning direction, in addition to the first electrode 131. That is, the first electrodes 131, 235 are provided on the both sides in the scanning direction of the ink-jet head 204. Further, a second electrode 236 is fixed to the inner wall surface of the casing 1a disposed on the side of the cap member 21 in relation to the scanning direction, in addition to the second electrode 132, and the second electrode 236 is retained at the ground electric potential. That is, the second electrodes 132, 236 are provided on the inner wall surfaces of the casing 1a disposed on the both sides in relation to the scanning direction. A dielectric 237 is arranged on a surface of the second electrode 236 opposed to the first electrode 235. The first electrode 235 and the head substrate 90 (electric current recovery circuit 93) are connected by the aid of a switch 238 intervening therebetween.

The standstill flushing is performed as follows in the same manner as in the first modified embodiment. That is, the ink-jet head 204 is moved to the position (left end as viewed in FIG. 11) opposed to the liquid receiving member 39 in a state in which the switches 133, 238 are turned OFF, and the first electrode 131 and the second electrode 132 are opposed to one another while providing a minute gap. After that, the ink-jet head 204 is driven in such a state that the switch 133 is turned ON and the switch 238 is turned OFF, and the inks are jetted from the nozzles 16 with respect to the liquid receiving member 39. Accordingly, the positive electric charge is accumulated in the first electrode 131.

The standstill flushing is performed as follows. That is, the ink-jet head 204 is moved to the position (right end as viewed in FIG. 11) opposed to the cap member 21 in a state in which the switches 133, 238 are turned OFF, and the first electrode 235 and the second electrode 236 are opposed to one another while providing a minute gap. After that, the ink-jet head 204 is driven in such a state that the switch 238 is turned ON and the switch 133 is turned OFF, and the inks are jetted from the nozzles 16 with respect to the cap member 21. Accordingly, the positive electric charge is accumulated in the first electrode 235.

As described above, the standstill flushing is performed on the both sides in the scanning direction respectively so that the first electrodes 131, 235, which are disposed on the both sides of the ink-jet head 204 in the scanning direction, can be electrically charged by accumulating the positive electric charge. Therefore, when the ink-jet head 4 is constructed to perform the two-way printing, it is possible to easily adsorb the mist, even when the mist is generated by jetting the inks during the period in which the ink-jet head 4 travels in any one of the directions. Further, the first electrodes 131, 235 are arranged on the both sides of the ink-jet head 204 in the scanning direction. Therefore, it is easy to keep the balance as compared with when the first electrode is arranged on only one side.

[Third Modified Embodiment]

In the embodiment described above, a part of the electric current, which is provided when the ink-jet head 4 is driven during the flushing, is recovered to drive the mist adsorbing device 7. However, a part of the electric current, which is provided when the ink-jet head 4 is driven during the recording operation for jetting the inks to the recording paper P, may be recovered to drive the mist adsorbing device 7. However, during the recording operation, the ink-jet head 4 is moved in the scanning direction. It is difficult to accumulate the electric charge while maintaining a state in which the first electrode-provided on the ink-jet head 4 and the second electrode 32 are disposed closely to one another. In view of the above, it is also appropriate to provide a charging circuit for the electric current recovery circuit as explained below.

Figure 12:
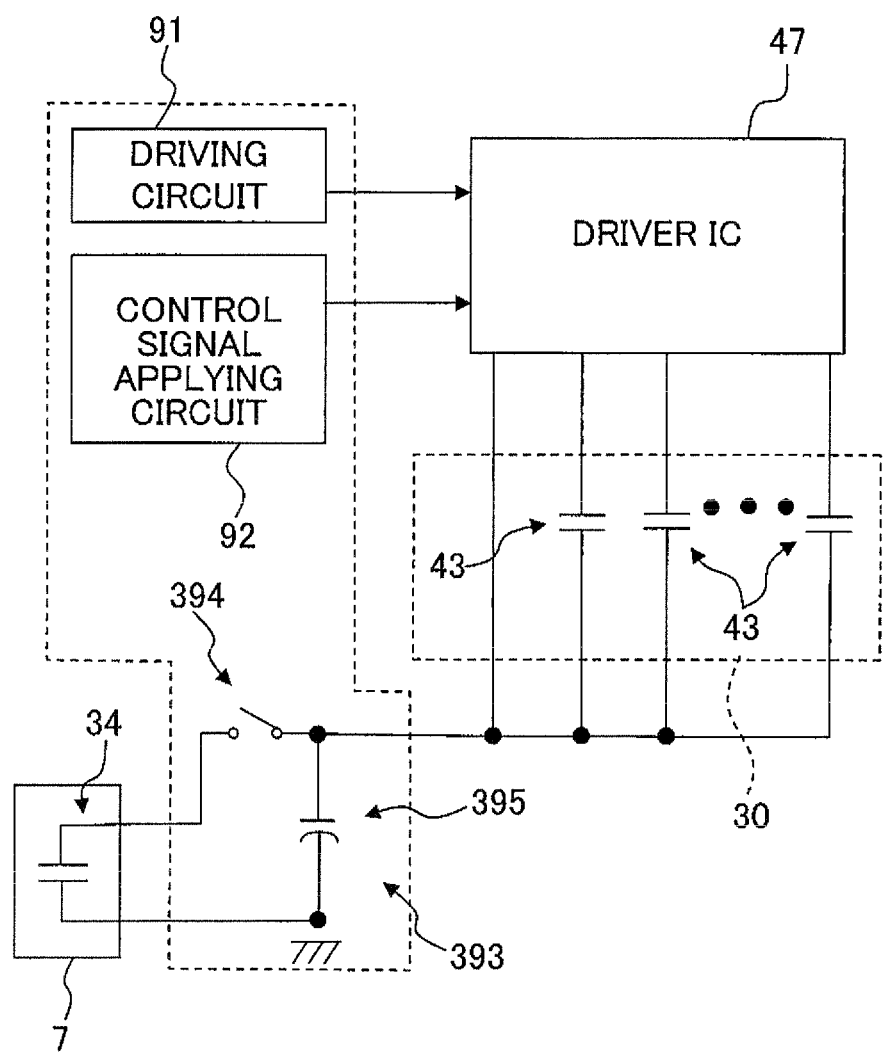
FIG. 12 shows an equivalent circuit diagram of a piezoelectric actuator and a circuit diagram of a head substrate in a third modified embodiment.

For example, as shown in FIG. 12, a electric current recovery circuit 393 has a switch 394 and an electrolytic capacitor 395, and the electric current recovery circuit 393 is connected to the same mist adsorbing device 7 as that provided in the embodiment described above. The switch 394 is connected between the mist adsorbing device 7 and the capacitor 43 of the piezoelectric actuator 30. The electrolytic capacitor 395 is connected in parallel to the capacitor 34 of the mist adsorbing device 7 with the switch 394 intervening therebetween.

The ink-jet head 4 is driven while turning OFF the switch 394, and the inks are jetted onto the recording paper P. Accordingly, a part of the electric current supplied to the capacitor 43 is charged in the electrolytic capacitor 395. After the completion of the jetting of the inks onto the recording paper P, the ink-jet head 4 is moved to the position opposed to the cap member 21, and the cap member 21 is moved to the empty suction position.

Subsequently, when the switch 394 is turned ON, then the electric current, which is discharged from the electrolytic capacitor 395, is supplied to the capacitor 34 formed between the first electrode 31 and the second electrode 32, and the capacitor 34 is charged. After that, when the cap member 21 is moved to the uncapping position, it is possible to electrostatically adsorb the mist by means of the positive electric charge electrified on the first electrode 31. When the charging circuit is provided for the electric current recovery circuit 93 as in this modified embodiment, then a part of the electric current supplied to the ink-jet head 4 can be recovered in all of the operations for driving the ink-jet head 4 including the operation performed during the flushing in addition to the operation performed during the recording operation, and it is possible to further enhance the energy efficiency.

[Fourth Modified Embodiment]

The embodiment described above has been explained in relation to the mode capable of being selected by the mode selector 64, as exemplified by the two modes of the high resolution recording mode and the low resolution recording mode by way of example. However, it is also allowable that a plurality of modes can be further selected in addition to the modes as described above. In this case, it is possible to set the number of times of execution of the flushing in the standstill flushing and the interval for performing the standstill flushing, depending on the sizes of the smallest liquid droplets to be jetted from the nozzles 16 in each of the modes. When the mode selector 64 can select the draft mode in which the recording operation is performed at an extremely high speed, the period of time, which is required for the recording operation, is extremely short. Therefore, it is also allowable that the number of times of execution of the flushing is decreased in the standstill flushing before the recording operation, and only the acceleration flushing is performed without performing the standstill flushing during the recording operation. Accordingly, it is possible to further shorten the period of time required until the recording operation is completed.

In the embodiment and the modified embodiments described above, the piezoelectric actuator is used as the actuator for jetting the inks from the nozzles 16. A part of the electric current, which is supplied when the piezoelectric actuator 30 is driven, is recovered by the electric current recovery circuit 93. However, the driving system of the actuator is not limited to the piezoelectric system, which may be, for example, the thermal system or the electrostatic system. For example, in the case of the thermal system, the heat, which is generated to jet the inks from the nozzles 16, may be recovered by means of a Peltier element, and the energy may be effectively utilized for the mist adsorbing device 7. In this case, the electric current is not recovered but the thermal energy is recovered as the part of the energy for driving the actuator. In this way, the energy, which is recovered during the driving of the actuator, is not limited to the electric current, which may be any energy including, for example, the thermal energy as described above. Note that the ink-jet head is heated during the driving of any types of the actuator. The thermal energy which is generated during the driving of the actuator and remains in the ink-jet head after driving the actuator can be recovered to convert into electric energy by thermal energy recovering device such as a Peltier element or an IC configured to generate electric power by the thermal energy. Then the converted electric energy can be supplied to the mist adsorbing device 7. That is, a part of the driving energy to be supplied to the ink-jet head can be recovered, before the driving energy reaches the ink-jet head. Alternatively, after the driving energy has reached the ink-jet head, a part of a residual energy which remains in the ink-jet head (such as a thermal energy) can be recovered.

In the embodiment and the modified embodiments described above, the mist adsorbing device 7, in which the mist is electrostatically adsorbed, is used as the device or apparatus for removing the mist. However, there is no limitation thereto. For example, a fan may be provided, and the fan may be driven by effectively utilizing the electric current recovered by the electric current recovery circuit 93.

In the embodiment and the modified embodiments described above, the first electrode 31, which is provided on the ink-jet head 4, is electrically charged positive, because the mist is electrically charged negative. However, if the mist is electrically charged positive, then the first electrode 31 may be electrically discharged negative by inversing the circuit construction, and the mist, which is electrically charged positive, can be also electrostatically adsorbed.

In the embodiment described above, the cap member 21, which is movable upwardly and downwardly, is utilized as the constitutive component for making separation and approach of the second electrode 32 with respect to the first electrode 31. However, it is also allowable to provide a mechanism for making separation and approach which is exclusively usable to effect the separation and approach of the second electrode 32 with respect to the first electrode 31. When the mechanism for making separation and approach is provided for the ink-jet head 4, it is also possible to accumulate the electric charge in the first electrode 31 when the ink-jet head 4 is driven during the recording operation, in addition to when the ink-jet head 4 is driven during the flushing.

The embodiment and the modified embodiments thereof explained above are examples in which the present teaching is applied to the ink-jet printer for recording, for example, letters and images by jetting the inks onto the recording paper. However, the application objective of the present teaching is not limited to those which are used for the way of use as described above. That is, it is possible to apply the present invention to various liquid jetting apparatuses in which various types of liquids other than the inks are jetted onto objectives depending on the way of use thereof.

What is claimed is:

1. A liquid jetting apparatus which jets a liquid onto a medium, comprising:
   a liquid jetting head having a nozzle formed therein through which the liquid is jetted;
   a driving unit which is configured to drive the liquid jetting head and to output energy to the liquid jetting head;
   an energy recovery mechanism which is configured to recover and supply a part of the energy supplied from the driving unit to the liquid jetting head;
   a mist removing unit to which the part of the energy recovered by the energy recovery mechanism is supplied so that the supplied energy is used to remove a mist generated under a condition that the liquid jetting head jets the liquid; and a cap member which is configured to be movable to:
  a capping position for covering a liquid jetting surface on which the nozzles of the liquid jetting head are open; and
  an uncapping position separated from the liquid jetting surface;

wherein the energy includes driving energy which is output by the driving unit for driving the liquid jetting head;

wherein the energy recovery mechanism is configured to supply the part of the driving energy recovered from the liquid jetting head to the mist removing unit;

wherein the mist removing unit includes an electric charge accumulating mechanism including a pair of electrodes, of a first electrode member and a second electrode member, each of which is configured to be charged by the supplied energy so that electric charge having a polarity different from that of the mist is accumulated onto one of the pair of the electrodes;

wherein the energy recovery mechanism is configured:
  to recover the part of the driving energy by incorporating a part of an electric current from the liquid jetting head; and
  to supply, to the electric charge accumulating mechanism, the recovered driving energy as an electric current;

wherein the first electrode member is arranged at an outer circumferential portion of the liquid jetting surface of the liquid jetting head;

wherein the second electrode member is provided on the cap member; and wherein the first electrode member or the second electrode member is connected to the energy recovery mechanism.

2. The liquid jetting apparatus according to claim 1;
wherein the energy recovery mechanism recovers the part of the driving energy to be supplied to the liquid jetting head during flushing in which the liquid is discharged from the nozzles to avoid drying;

wherein the second electrode member is arranged to face the first electrode member while providing a gap with respect to the first electrode member at a position neater to the first electrode member in a case that the cap member is positioned at the capping position as compared a case that that the cap member is positioned at the uncapping position; and wherein the energy recovery mechanism is configured to supply the electric current between the first electrode member and the second electrode member in a case that the cap member is positioned at the capping position to perform the flushing.

3. The liquid jetting apparatus according to claim 2, further comprising:
a sucking mechanism which is connected to a suction port formed on the cap member and which sucks interior of the cap member in a state in which the cap member is positioned at the capping position to perform suction purge for discharging the liquid from the nozzles;

wherein the cap member is configured to be movable to an intermediate position which is disposed nearer to the capping position as compared with the uncapping position, which is a position separated from the liquid jetting surface, and at which the liquid received in the cap member is sucked and discharged after the suction purge; and wherein the energy recovery mechanism is configured to suppy the electric current between the first electrode member and the second electrode member of the electric charge accumulating mechanism under a condition that the flushing is performed while positioning the cap member at the intermediate position.

4. The liquid jetting apparatus according to claim 2, further comprising:
a first switching mechanism which is configured to switch the energy recovery mechanism and the first electrode member of the electric charge accumulating mechanism to be in a conduction state in which electric connection is made and a non-conduction state in which no electric connection is made;

wherein the first switching mechanism allows the energy recovery mechanism and the first electrode member to be in the conduction state during the flushing, and the first switching mechanism switches the energy recovery mechanism and the first electrode member to be in the non-conduction state before the second electrode member is relatively moved in a direction to make separation from the first electrode member after the flushing.

5. The liquid jetting apparatus according to claim 2, further comprising:
a scanning mechanism which is configured to reciprocatively move the liquid jetting head in a scanning direction;

wherein the cap member is arranged at one end portion in the scanning direction within a movement range of the liquid jetting head in the liquid jetting apparatus; and wherein the liquid jetting apparatus further comprising: a wall portion having a wall surface which is provided at the one end portion, and a third electrode member which is arranged on the wall surface of the wall portion so that the third electrode member is brought in contact with the energy recovery mechanism and the first electrode member to electrically connect the both in a state in which the liquid jetting head is moved to the one end portion by the scanning mechanism.

6. The liquid jetting apparatus according to claim 5, further comprising:
another wall portion having a wall surface which is provided at the other end portion in the liquid jetting apparatus; and another third electrode member, which is arranged on the another wall surface so that the another third electrode member is brought in contact with the energy recovery mechanism and the first electrode member to electrically connect the both in a state in which the liquid jetting head is moved to the other end portion by the scanning mechanism.

7. The liquid jetting apparatus according to claim 2,
wherein the liquid jetting head is configured to record an image on the medium and to perform the flushing before a recording operation for recording the image on the medium; and wherein the energy recovery mechanism is configured to recover the part of the driving energy to be supplied to the liquid jetting head during the flushing before the recording operation, and to allow the electric charge accumulating mechanism to accumulate electric charge having a polarity different from that of the mist.

8. The liquid jetting apparatus according to claim 2, further comprising:
a jetting control mechanism which is configured to control the liquid jetting head;

wherein the liquid jetting head is configured to record an image on the medium and to jet a plurality of types of liquid droplets having different sizes from the nozzles;

wherein the jetting control mechanism selects one mode from at least two recording modes of a low resolution recording mode and a high resolution recording mode having a resolution higher than that of the low resolution recording mode so that small liquid droplets are jetted from the nozzles in a case that the high resolution recording mode is selected as compared with a case that the low resolution recording mode is selected; and wherein the jetting control mechanism controls the liquid jetting head to decrease a frequency of the flushing to be performed within a period in a case that the selected mode is the high resolution recording mode as compared with a case that the selected mode is the low resolution recording mode.

9. The liquid jetting apparatus according to claim 2, further comprising:

a jetting control mechanism which is configured to control the liquid jetting head, wherein the liquid jetting head is configured to record an image on the medium and to jet a plurality of types of liquid droplets having different sizes from the nozzles;

the jetting control mechanism selects one mode from at least two recording modes of a low resolution recording mode and a high resolution recording mode having a resolution higher than that of the low resolution recording mode so that small liquid droplets are jetted from the nozzles in a case that the high resolution recording mode is selected as compared with a case that the low resolution recording mode is selected; and the jetting control mechanism controls the liquid jetting head to increase a number of times of jetting of the liquid from the nozzles during the flushing in a case that the selected mode is the high resolution recording mode as compared with a case that the selected mode is the low resolution recording mode.

10. The liquid jetting apparatus according to claim 2;

wherein the electric charge accumulating mechanism has a dielectric member which is arranged on at least one surface of mutually opposing surfaces of the first electrode member and the second electrode member.

11. The liquid jetting apparatus according to claim 2, further comprising:

a scanning mechanism which is configured to reciprocatively move the liquid jetting head in a scanning direction;

wherein the first electrode member is arranged on the liquid jetting surface at both sides of the nozzle in the scanning direction.

12. The liquid jetting apparatus according to claim 1, further comprising:

a scanning mechanism which is configured to reciprocatively move the liquid jetting head in a scanning direction; and a liquid receiving section which is arranged at one end portion in the scanning direction within a movement range of the liquid jetting head and which is configured to receive the liquid jetted from the liquid jetting head, wherein the energy recovery mechanism is configured to recover the part of the driving energy to be supplied to the liquid jetting head during flushing in which the liquid is discharged from the nozzles to avoid drying;

wherein the electric charge accumulating mechanism includes:

a first electrode member which is arranged on a side surface of the liquid jetting head disposed on one side in the scanning direction; and a second electrode member which is arranged on a wall surface provided at the one end portion opposed to the first electrode member so that a gap is formed between the first electrode member and the second electrode member in such a state that the liquid jetting head is moved to the one end portion; and wherein the energy recovery mechanism is configured to supply the electric current between the first electrode member and the second electrode member under a condition that the flushing is performed in such a state that the liquid jetting head is moved to the one end portion by the scanning mechanism and the liquid jetting head is opposed to the liquid receiving section.

13. The liquid jetting apparatus according to claim 1;

wherein the liquid jetting head has an individual flow passage including the nozzle formed therein and a piezoelectric actuator which is configured to apply the jetting energy to the liquid contained in the individual flow passage.

14. The liquid jetting apparatus according to claim 1;

wherein the energy recovery mechanism includes a transformer having a first winding and a second winding;

wherein the first winding is electrically connected to the liquid jetting head; and wherein the second winding is electrically connected to the mist removing unit.

15. A liquid jetting apparatus which jets a liquid onto a medium, comprising:

a liquid jetting head having a nozzle formed therein through which the liquid is jetted;

a driving unit which is configured to drive the liquid jetting head and to output energy to the liquid jetting head;

an energy recovery mechanism which is configured to recover and supply a part of the energy supplied from the driving unit to the liquid jetting head;

a mist removing unit to which the part of the energy recovered by the energy recovery mechanism is supplied so that the supplied energy is used to remove a mist generated under a condition that the liquid jetting head jets the liquid; and a cap member which is configured to be movable to:

a capping position for covering a liquid jetting surface on which the nozzles of the liquid jetting head are open; and an uncapping position separated from the liquid jetting surface;

wherein the energy includes driving energy which is output by the driving unit for driving the liquid jetting head;

wherein the energy recovery mechanism is configured to supply the part of the driving energy recovered from the liquid jetting head to the mist removing unit;

wherein the mist removing unit has an electric charge accumulating mechanism including a pair of electrodes, of a first electrode member and a second electrode member, each of which is configured to be charged by the supplied energy so that electric charge having a polarity different from that of the mist is accumulated onto one of the pair of the electrodes;

wherein the energy recovery mechanism is configured:

to recover the part of the driving energy by incorporating a part of an electric current from the liquid jetting head; and to supply, to the electric charge accumulating mechanism, the recovered driving energy as an electric current;

wherein the first electrode member is arranged at an outer circumferential portion of the liquid jetting surface of the liquid jetting head; and wherein a second electrode member is provided on the cap member.

16. The liquid jetting apparatus according to claim 15, further comprising:

a charging unit which is configured:
  to store the driving energy recovered by the energy recovery mechanism; and
  to convert the stored driving energy into an electric current to release; and a second switching mechanism which is configured to switch the charging unit and the electric charge accumulating mechanism to be in a conduction state in which electric connection is made, and to be in a non-conduction state in which no electric connection, is made;

wherein the second electrode member is arranged opposingly while providing a gap with respect to the first electrode member at a position nearer to the first electrode member in a case that the cap member is positioned at the capping position, as compared to a case where the cap member is positioned at the uncapping position; and wherein the charging unit is configured to supply the electric current between the first electrode member and the second electrode member under a condition that, after the second switching mechanism switches the charging unit and the electric charge accumulating mechanism to be in the non-conduction state and the liquid jetting head is driven, the charging unit and the electric charge accumulating mechanism are switched to be in the conduction state by the second switching mechanism while positioning the cap member at the capping position.

* * * * *